United States Patent [19]

Van Eenam

[11] 4,333,971
[45] Jun. 8, 1982

[54] SUBSTRATE TREATING COMPOSITIONS

[75] Inventor: Donald N. Van Eenam, Des Peres, Mo.

[73] Assignee: Monsanto Company, St. Louis, Mo.

[21] Appl. No.: 270,777

[22] Filed: Jun. 5, 1981

[51] Int. Cl.$^3$ ............................................. B05D 3/02
[52] U.S. Cl. .......................... 427/389.9; 162/164 EP; 162/169; 427/391; 525/59; 525/55; 525/404; 525/529; 524/529; 524/533; 524/534
[58] Field of Search ............................ 427/391, 389.9; 162/164 EP, 168 R, 169, 135; 525/59, 55, 404, 529; 260/29.6 NR

[56] References Cited

U.S. PATENT DOCUMENTS

| | | | |
|---|---|---|---|
| 4,049,634 | 9/1977 | Ko et al. ........................ | 260/40 R X |
| 4,064,304 | 12/1977 | Fujita et al. ..................... | 162/169 X |
| 4,145,248 | 3/1979 | Van Eenam ..................... | 162/168 R |
| 4,289,808 | 9/1981 | Huang ............................. | 427/209 X |
| 4,289,864 | 9/1981 | Van Eenam ..................... | 162/169 X |
| 4,291,101 | 9/1981 | Tanizaki et al. .................... | 428/514 |
| 4,296,227 | 10/1981 | Seeburger et al. .................. | 526/320 |

Primary Examiner—Norman Morgenstern
Assistant Examiner—Thurman K. Page
Attorney, Agent, or Firm—David Bennett; William J. Farrington; Paul D. Matukaitis

[57] ABSTRACT

The properties of a fibrous substrate are improved by application of a composition comprising a hydrophilic air-curing polymer and a compound comprising at least two free radical polymerizable unsaturated groups. The composition can optionally contain in addition a latex of a thermoplastic polymer.

14 Claims, No Drawings

SUBSTRATE TREATING COMPOSITIONS

BACKGROUND OF THE INVENTION

The invention relates to compositions that are capable of increasing the physical properties, particularly the strength of fibrous substrates when applied thereto.

When a fibrous material such as paper is freshly made, it lacks any substantial strength when it is wetted and tends to fall apart. This is a serious drawback in many applications of cellulosic substrates, particularly in domestic and commercial papers that are intended to absorb water and yet be able to withstand moderate abrasive and/or tensile forces.

It is in this context that the present invention finds its primary utility and will hereinafter be described. However it should be appreciated that the improved strength imparted by the compositions of the invention to fibrous substrates can have utility in other fields than the production of stronger absorbent, paper sheet materials. The compositions can for example be applied to cotton fabrics or even non-cellulosic fabric materials with advantageous results. They can also be adapted to yield other desirable property improvements by judicious selection of the components.

DISCUSSION OF THE PRIOR ART

Compositions for improving the wet strength of paper substrates are well known in the art. Conventional varieties are added at the wet-end of a paper making process and cure as the paper is dried.

Recently however there has been developed a series of polymers that are air-drying, that is to say, they crosslink on exposure to air in the manner of alkyd-based paint compositions, while nevertheless retaining a hydrophilic character. This hydrophilicity enables them to translocate along cellulosic fibers to fiber/fiber crossover points and there cure to give the fibrous structure a coherence it can retain even when wet.

These polymers are extremely significant since they allow addition of wet strength properties to a dry paper web. Hitherto strength has been imparted using a latex of a thermoplastic polymer that was capable of undergoing thermolysis and cross-linking at a temperature low enough to avoid damage to the fibers. Since such polymers tend to be hydrophobic in character, it was often found that the strength imparted was limited and restricted to surface regions.

Typical of the polymers discovered are those described in U.S. Pat. No. 4,145,248 and these are hereinafter referred to generically as polyether-enes though it is understood that the structures embraced by that patent are not confined to polyether-enes. The term is used to embrace both the polymer as made and the product obtained by air-bodying the polymer as described in this patent.

The above polymers show substantial utility alone in the development of wet strength in cellulosic fibrous substrates. It is found however that the ratio of wet strength to dry generally stays below 0.5 whereas for many purposes the desired ratio is around 0.6.

The compositions useful in the process of the present invention provide the capability of generating wet/dry strength ratios in the desired range without significant sacrifice of wet strength level. Moreover the compositions retain the ease of application of the hydrophilic polyetherenes and provide a dry-end application capability that is most attractive for many users.

DESCRIPTION OF THE INVENTION

The present invention provides a process for improving the physical properties of a fibrous substrate which comprises applying thereto a composition of matter comprising:

A. a hydrophilic polyether-ene having the formula

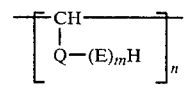

where Q is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation, either $\alpha$, $\beta$ or $\beta$, $\gamma$ to the activating group, n is the number of adjacent (as the term is hereinafter defined) segments having this formula, and n and m are integers and are each at least 1, provided that where one is less than 4 the other is at least 4; and B. a non-air curing compound having a structure comprising at least two free-radical polymerizable unsaturations; and allowing the composition to cross-link cure irreversibly on the substrate.

As will be appreciated from what follows the present invention is founded on the discovery that the unsaturated compound can react with the polyether-ene to form a composition suitable for application to a cellulosic substrate. This reaction occurs with the air-bodied polyether-ene, or with the non-air-bodied polyether-ene if conducted in the presence of oxygen. This is because the air-bodying reaction is one that occurs very readily when the polyether-ene is exposed to oxygen.

This is an unexpected effect and is believed to reflect the ability of the air-curing polyether-ene to interpolymerize with the unsaturated compound to form a unitary crosslinked structure and a consequent improvement in the properties of any substrate to which the composition has been applied. Regardless of theory it is observed that the wet/dry strength ratio of cellulosic substrates treated with the compositions of the invention is significantly improved over that observed with either component alone and to a degree that clearly indicates a synergistic interaction between the two.

Other miscible mono-olefinic monomers capable of free-radical co- or inter-polymerization may be employed, provided that all components of the resultant mixture undergo a thermoset cure, or an irreversible crosslinking, in concert with Component A. Typical monomers include acrylates and vinyl esters.

A. THE POLYETHER-ENE COMPONENT

As indicated above the polyether-ene component is described in U.S. Pat. No. 4,145,248. The polymers are defined by formula (I) above and as produced are hydrophilic liquids soluble or readily emulsifiable in water. The polymers can be "air-bodied" by bubbling oxygen, or an oxygen-containing gas mixture such as air, through a solution or dispersion of the polymer. This has the effect of increasing the viscosity of the solution/emulsion as a result of the initiation of crosslinking between the polymer molecules. The use of the term polyether-ene in this specification is intended to embrace both air-bodied and untreated forms unless otherwise specified.

The untreated polyether-enes useful in the process of the invention can have a plurality of adjacent segments of the above formula and by "adjacent" is meant that they are directly connected through a carbon-carbon bond or are indirectly connected through a

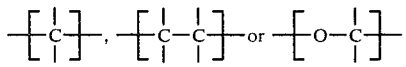

group or an oxygen or sulfur atom.

The effectiveness of the polyether-ene depends to some extent on the provision of a plurality of activated double bonds in blocks which are spatially closely related. These double bonds are sites at which oxygen-initiated crosslinking takes place during the drying or accelerated or natural aging operation. Thus, the provision of blocks of activated double bonds each of which can provide a bond site, increases the potential crosslink density as well as the structural strength of the cross-links that form both inter- and intramolecularly during drying and/or aging.

The double bonds are activated, by which is meant that by virtue of their proximity in the polymer molecule to other strongly electron-donating groups they are more ready to form crosslinks during the air drying process. Examples of such electron-donating groups include ether, sulfide, hydroxyl, carboxyl, amido and olefinically-unsaturated groups. The preferred electron-donating group is an ether group.

Polyether-enes are hydrophilic. Certain of the suitable polymers are completely soluble in water. This may be achieved by the choice of the backbone compound but it may also be the result of the selection of an appropriate molecular ratio of backbone compound to the reactant affixing the pendant unsaturation to the backbone. Alternatively, the introduction of highly water-solubilizing groups such as quaternary ammonium, sulfonium, phosphonium, isothiouronium and other similar cationic groups or the incorporation of a plurality of ether oxygen atoms can be used to achieve water solubility or emulsifiability. The description of the polyether-enes as "hydrophilic" is therefore, to some extent, a reflection of the ratio of oxygen to carbon in the polymer. Generally, the greater the ratio the more hydrophilic is the polymer. However, hydrophilicity is best observed by the behavior of water placed on a fibrous surface that is normally absorbant (i.e. which is unmodified with additives that would destroy its porosity) that has been treated with the polymer. A hydrophobic polymer such as a drying oil-based paint causes the water to run off or form discrete droplets on the fibrous surface which, in effect, is waterproofed. A hydrophilic polymer on the other hand, allows the surface to become wetted and, if of a porous material, allows the water to be absorbed into the material by a "wicking" effect. This property is of course, highly desirable when the product treated with the polymer of the invention is a paper product where improved wet and dry strength are desirable characteristics.

Qualitatively therefore, the term "hydrophilic" polymer is understood to describe a polymer that can be applied to an unmodified cellulosic substrate without causing water applied to the treated substrate to run off or form discrete droplets. In other words, the polymer does not destroy the power of the substrate to absorb water or to be wetted by it.

Quantitatively it is found that hydrophobic polymers have a surface energy of about 40 dynes or less (water has a surface energy of 72 dynes). "Hydrophilic" polymers suitable for imparting wet/dry strength to cellulosic substrates, have surface energies of at least 50 and an unmodified cellulosic substrate treated therewith has a surface energy of at least 65 dynes.

The polyether-enes can be formed by the reaction of a compound having an activated double bond and epoxy group with a molecule having a plurality of active hydrogen-containing groups selected from alcoholic hydroxyl, thiol, amide and carboxylic acid but not primary amine groups. Since it is also desirable that the polymer be hydrophilic it is often preferred that hydroxyl groups should provide the active hydrogen-containing groups. The polymer should not contain primary or secondary amine groups or phenolic hydroxyl groups since such groups interfere with the drying reaction.

The polyether-enes can for example, be prepared by the reaction of a backbone compound having at least one and preferably from 1 to 6 moieties containing active hydrogen-containing groups with a compound containing both an epoxide group and an activated double bond in proportions such that from 1 to 20 epoxide radicals are provided for each active hydrogen-containing groups on the backbone compound and the polymer produced has at least one block of at least four adjacent activated double bonds.

Alternatively, a polymer chain having a plurality of adjacent pendant hydroxyl groups can be reacted with, for example, allyl chloride using the techniques of Williamson's ether synthesis. Alternatively, the same Williamson synthesis technique may be employed using a polymer chain with pendant halogen atoms and an unsaturated alcohol such as allyl alcohol. This results in the generation of adjacent allyloxy groups pendant from the polymer backbone that can form a suitable block of unsaturation conferring the desired air-drying characteristics on the polymer.

Yet another method by which polyether-enes may be prepared is by the Lewis acid promoted polymerization of vinyl allyl ether. This reaction is selective to the vinyl group and results in a chain of carbon atoms with an allyloxy group pendant from every other carbon atom.

There are, therefore, two basic types of polymer embraced by Formula (I). The first type comprises a backbone molecule with as little as one moiety containing an active hydrogen-containing group which is reacted with a compound containing an epoxy group and an activated terminal double bond in proportions such that there are at least four and preferably from 4 to 10 or even 20 epoxy groups per active hydrogen-containing group. As a simple example the polymer obtained by reacting 1 mole of glycol with 8 moles of allyl glycidyl ether produces a polymer having the average structure

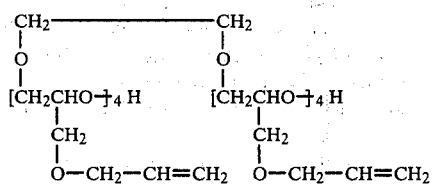

—thus providing two blocks of four adjacent allylic groups—assuming of course, uniform addition at both sides. In this compound the moiety A in formula (I) is —O— and the moiety E is

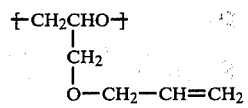

and has the double bond $\beta$, $\gamma$ to the activating ether group.

The other type of structure is obtained for example, when a backbone molecule which comprises at least four adjacent active hydrogen-containing groups is reacted with an unsaturated epoxy compound as described above or alternatively, using Williamson's ether synthesis, with allyl chloride to produce a block of pendant allylic groups. In this case the ether oxygen provides the activation for the double bond in the allyl group and also the group "Q." An example of such a product is that produced by the reaction of allyl chloride with polyglycidol to produce a polymer having structure with repeating units of the formula

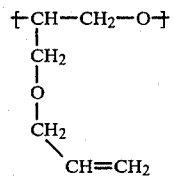

Here the moiety Q in formula (I) is —CH$_2$O—, the moiety E is —CH$_2$—CH=CH— and m is 1 and n is at least 4, the olefinic unsaturation is $\beta$, $\gamma$ to the activating oxygen.

The backbone compound can therefore, be a polymeric polyol such as polyethylene glycol, polyglycerol, polyglycidol, polyvinyl alcohol, a partially hydrolyzed polyvinyl acetate, a styrene/allyl alcohol copolymer, poly (2-hydroxyethyl) acrylate), poly (vinyloxyethanol), a monomeric polyol such as sorbitol, mannitol, or ethylene glycol; a monomeric polyol such as sorbitol, mannitol, or ethylene glycol; a monomeric alcohol such as allyl alcohol, the corresponding thiols; and dicarboxylic acids such as fumaric acid, maleic acid, malonic acid and phthalic acid. Also, compounds containing a mixture of radicals can be used such as hydroxy acids, which are compounds containing the carboxyl and hydroxyl radicals, hydroxy amides, hydroxy ethers, hydroxy esters, and the like. However, polyhydric alcohols having from 2 to 6 carbon atoms are preferred and sorbitol is especially preferred.

The epoxy compound reacted with the backbone compound comprises an epoxide group and an activated double bond.

The epoxy compounds that can be used have the general formula

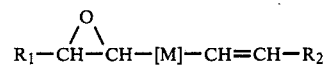

wherein M is absent or is a group capable of activating the double bond such as for example the following

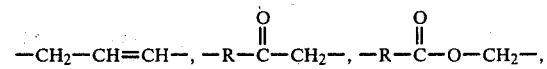

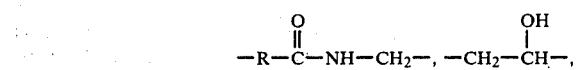

—CH$_2$—O—, —CH$_2$—S—, —CH$_2$—O—CH$_2$—, and —CH$_2$—S—CH$_2$—, wherein R is a C$_1$ to C$_4$ alkylene group and R$_1$ and R$_2$ are each hydrogen or C$_1$ to C$_4$ alkyl groups. The corresponding episulfides may also be used.

It is important that the activating group does not comprise a moiety that will inhibit or deactivate the aircuring mechanism. Such disfavored groups include free primary and secondary amine, phenolic hydroxyl and aldehyde groups.

Preferred compounds include allyl glycidyl ether, sorbyl glycidyl ether, butadiene monoxide and vinyl cyclohexene monoxide. The most preferred reactant which is also readily available at relatively low cost is allyl glycidyl ether.

One particularly preferred feature is the use of an allyl glycidyl ether reaction product obtained by the reaction of a small excess of epichlorohydrin with allyl alcohol. The allyl glycidyl ether reaction product has the empirical formula:

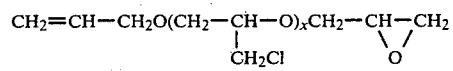

where x is a fraction up to 0.5, usually about 0.25.

It is preferred that the above reaction product is dried before use such that it contains less than about 0.1% by weight of water which would otherwise give rise to undesirable side reactions.

This preferred feature is not confined to the specific allyl glycidyl ether reaction products described above. Expressed more generically, preferred polymers of the invention that can be produced using such products have the formula:

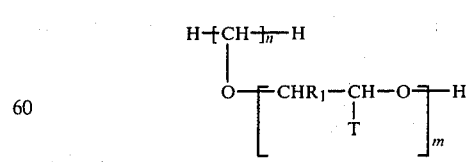

wherein n is an integer which is preferably from 2 to 6; m is an integer which is preferably from 6 to 10 with the proviso that where either of m or n is less than 4 the other is at least 4; R$_1$ is hydrogen or a C$_1$ to C$_4$ alkyl group; and T is a moiety with the empirical formula:

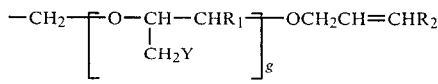

where g is a fraction up to 0.5; Y is halogen or, in the event the halogen has been replaced by a quaternary group, an ammonium, phosphonium or sulphonium radical and $R_2$ is hydrogen or a $C_1$ to $C_4$ alkyl group.

The product of the reaction between the halogen-containing allyl glycidyl ether reaction product and the active hydrogen-containing backbone compound will therefore have a number of pendant —$CH_2Cl$ groups which may be reacted with a tertiary amine such as trimethylamine to form a quaternized amine derivative and therefore, a number of cationic charges on the polymer molecule. This makes the application to cellulosic substrates more efficient and permits "wet end" addition of the additive, that is, the polymer can be exhausted onto pulp fibers while dispersed before they are formed into a sheet, rather than applied to the finished substrate sheet.

The number of quaternary groups introduced into the polymer need not be enough to render it water-soluble. Often a relatively modest amount is enough to improve the dispersibility of the polymer in aqueous solutions even to the extent of leading to complete emulsification of the polymer when simply hand shaken with water. An alternative method of introducing the quaternary group is to form a derivative of the hydroxyl group at the end of a chain of polymerized glycidol groups that can be converted to a quarternary group. For example, an epoxy group can be formed thereon and this may then be condensed with a tertiary amine to produce a quaternary ammonium group with the same general result as has been described above.

The reaction of the epoxy compound with the backbone molecule can take place under the influence of an acid catalyst, preferably a Lewis acid such as boron trifluoride, antimony pentafluoride, tin tetrachloride, phosphorus pentafluoride, zinc fluoborate or anhydrous hydrogen fluoride. Alternatively, but less preferably, a Lewis base such as sodium hydride or potassamide can be used. The temperature at which the reaction is performed is generally from 0° to 120° C. and preferably from 50° to 80° C.

The amount of polyether-ene (Component A) in the composition used in the process of the invention is usually anything from 2 to 98% of the combined weights of components A and B. Preferably however, the percentage lies in the range 5 to 60% of the combined weights of A and B. There is however no absolute lower limit. The polyether-ene appears to act as an initiator as well as a comonomer and where the polymer of the activated olefinic monomer can usefully be applied alone to improve the properties of a fibrous substrate, truly catalytic amounts of the polyetherene, such as from 0.01 to 1% by weight can be used.

B. THE UNSATURATED COMPONENT

The Component B of the composition of the invention is a compound comprising at least two free radical polymerizable unsaturated groups.

The free radical polymerizable compound can have unsaturations that are selected from (meth)allylic, (meth)acrylic, styrenic, maleic, fumaric, or vinyl provided these are active towards free radical polymerization. The preferred unsaturated groups are of the acrylic variety since these tend to produce the most advantageous results on application to a fibrous substrate. The resulting cross-linked polymer product usually has hydrolytic stability, and color fastness. The treated substrates usually exhibit softness and good "hand" and the curing process results is no objectionable by-products or odors.

The term "acrylate" as used hereafter is intended to embrace also the substituted variations that comprise the structure

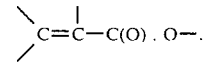

The term therefore includes methacrylates and ethacrylates as well as the conventional acrylates. The component is generally a monomer but it is observed that it can often advantageously be the diacrylate derivative of a polyalkylene glycol.

The acrylates are particularly desirable components of the present invention since they possess a generally low carbon to oxygen ratio and this generally indicates hydrophilic character. Such hydrophilic character is of course highly desirable when treating a cellulosic substrate. Generally acrylates with a carbon to oxygen ratio of less than 3:1 and preferably less than 2.5:1 are selected.

Examples of suitable acrylic components include trimethylol propane trimethacrylate; dipentaerythritol hydroxypentaacrylate; pentaerythritol tetraacrylate; tripropylene glycol diacrylate; 1,4 butanediol diacrylate; triethylene glycol dimethacrylate; polypropylene glycol (8) dimethacrylate; and polyethylene glycol dimethacrylate. In addition to the above, the homologous citraconates, mesaconates, aconitates, itaconates, and sorbates can be used.

Examples of suitable non-acrylic compounds that can be used include di- and tri-alkenyl esters, amides and ethers as well as cyanates, isocyanurates, and melamines containing two or more vinyl or allyl functionalities.

THE COMPOSITION

Depending on the nature of the substrate whose properties are to be modified, the modification sought and the solubility/flow characteristics of the formulation, the compositions are generally converted into aqueous emulsions or latex/emulsions or latex/emulsion blends for easy application. This may be achieved using the standard techniques practiced in the art.

In addition to Components A and B discussed above the composition can additionally comprise other components with advantageous results.

It is found for example that air-drying of the composition is accelerated by the presence of traces of heavy metal salts including for example, cobaltous acetate, cobaltous octoate, manganous acetate and other organic salts of transition metals known to be capable of functioning as "metallic driers" in the paint field. Organic peroxides such as benzoyl peroxide and similar hydroperoxides are also found to be effective either alone, with tertiary amines or in conjunction with known promoters and/or the metallic driers described above.

The incorporation of from 0.001 to 0.1% by weight of such a salt to a fibrous substrate, along with the polymer is a preferred feature of the present invention.

In addition to the crosslinking Component B containing two or more free radical polymerizable unsaturations, it is possible to use varying amounts of monomers containing a single such unsaturation. As will be appreciated such monomers are not effective in generating cross-links but act as "extenders" of the Component B compound. Generally the amount of such an extender will be determined by the degree of reduction in the overall cross-link density that can be tolerated. In practice a monounsaturated compound can replace up to 50 to 60% of the weight of the poly-unsaturated compound. Suitable monounsaturated free-radical polymerizable monomers include methyl methacrylate, ethyl acrylate, 2-ethylhexyl acrylate, styrene, allyl acetate and vinyl acetate.

It is further found that the compositions described above can be used to replace the polyether-enes in the compositions described in U.S. Ser. No. 121,849 filed Feb. 15, 1980. Thus an additional component of the composition can be a latex of a thermoplastic polymer. Such latices are found to co-act with the compositions used in the process of the invention to further enhance the strength properties obtained. This in itself is unexpected since the latex will usually have a somewhat hydrophobic character that does not lend itself well to easy dispersion through a dry-laid web of cellulosic fibers. However it would appear that the mixture of Components A and B, which is an emulsion or solution in water, has the effect of aiding in the dispersion of the latex particles through the web. Further, the bonding processes are aided such that the net result is an excellent balance of wet and dry strength enhancement.

The polymer must be carefully selected to ensure that the treated substrate has appropriate properties. Thus if the composition is to be added to paper and it is desirable that the final product be soft and pliable, an appropriate latex would have a glass transition temperature (Tg) below about 40° C. such as from $-50°$ C. to 30° C.

The amount of polymmer added (in the form of latex) is preferably that needed to provide approximately 10 to 60% such as from 20 to 50% of the total solids weight in the composition.

It is preferred that the latex polymer be a homopolymer or a copolymer of an unsaturated ester monomer such as a vinyl or allyl ester or an acrylate ester. Specific examples of suitable thermoplastic latices include: polyvinyl acetate, ethylene/vinyl acetate copolymers, ethylene/vinyl chloride copolymers, polyvinyl chloride, poly(isobutyl vinyl ether), and various acrylic polymers commercially available as latices. Other less preferred latices include polybutadiene, copolymers of butadiene with styrene or acrylonitrile, polyisoprene, and polyolefins such as polyethylene, polypropylene, and polyisobutylene.

It is of course necessary that the polymer does not interfere with the air-curing chemistry of the polyether-ene component or the polymerization of the unsaturated compound. This is the case for example with highly reactive polymers such as the polyethyleneimines, polymers containing an —NH— functionality as well as other compounds which act as free radical inhibitors, stabilizers, antioxidants and the like.

Vinyl acetate based polymer latices are particularly useful in the compositions of the invention since they readily undergo thermolysis reactions and subsequent cross-linking. This in fact is one mechanism by which some polymer latices that are conventionally added to air laid webs generate an increase in wet as well as dry strength. A preferred polymer latex is one which undergoes thermolysis below about 160° C. and more preferably 80°–110° C. so that the underlying substrate is not damaged. Such polymers are generally film-forming thermoplastic polymers and copolymers and comprise groups that can easily be split off in a thermolysis reaction.

Less preferred polymers are those that contain a plurality of unsaturations and are capable of undergoing a curing operation while in place on a substrate. As an example both liquid polybutadiene emulsions and particulate solid latices are capable of undergoing an air-curing type cross-linking operation and it is found that these interactions are aided by the presence of a polyether-ene. However such polymers tend to be somewhat hydrophobic so that large amounts of a suitable surfactant are usually needed before the composition is adapted for application to a cellulosic substrate.

The latex usually comprises dispersed polymer particles with a weight mean average diameter of from 0.05 to 2.0 micron and preferably from 0.2 to 0.8 micron.

The dispersion medium is most conveniently water but this is not essential since the chief function of the liquid is to aid application to, and transport of the composition through, any fibrous substrate to which it may be applied. In the case of a hydrophilic substrate it would clearly be desirable to use a hydrophilic dispersion medium.

A further optional and advantageous component of the composition used in the process of the invention is a polyhydroxy compound such as glycerol. The amount of the polyhydroxy compound added can be up to 20% by weight based on the total active weight in the composition. It is found that the presence of such additives markedly improves the hydrophilicity of the composition may be dispersed throughout a fibrous cellulosic substrate. The polyhydroxy additive may also act as a plasticizer for the latex where one is present.

Other conventional additives such as plasticizers, stabilizers, fillers, coloring material and additives to modify other properties such as stain resistance, water absorption and the like can of course be added if desired.

The composition of the invention can be added at any level to obtain the desired degree of property improvement. In general however an application of the composition at a level of from 5 to 500 kg. (dry solids weight) per metric ton of the fibrous substrate is adequate. If the composition is used to generate a balance of wet and dry strength in paper substrates an application level of from 100 to 300 kg. per metric ton is found to be useful.

TEST TECHNIQUES

In the Examples that follow the performance of various compositions is evaluated for wet and dry strength of a substrate treated with the composition. Each is catalyzed using a cobaltous salt. The technique used to make the evaluations is as follows.

The compositions were each sprayed onto duplicate Whatman #1 filter paper circles (12.5 cm diameter; 1.25 g in weight) using a technique permitting equal pickup on both sides. Unless otherwise specified the total wet pickup weight per circle of filter paper was 0.9 g which is equivalent to a dry add-on weight of 200 kilos per metric ton of paper.

The filter paper circles were dried at 120° C. in an air-circulating oven for 10 minutes and then kept at constant temperature and humidity until tested.

Testing was performed on an Instron tensile tester. One inch strips were cut from one circle in the machine direction (MD), and from the other in the cross-machine direction (CD), from either side of the center-fold. Two dry tensile strength measurements were made on each of the two sets of test strips and an average value was computed. The wet tensile strength samples were additionally soaked for 5 minutes in a 1.0 percent aqueous solution of a sodium ($C_{11}$–$C_{12}$) alkyl benzene sulfonate emsulfier, rinsed with water and lightly dried with a blotter.

In addition some substrates that had been treated and cured were tested for their water wicking time to provide a measure of the hydrophilicity of the cured compound. Generally a water wicking time below about 30 seconds indicates good hydrophilicity. The lower the time, the greater is the hydrophilicity. The test is performed on a filter paper treated as above in preparation for wet/dry strength testing. A 0.10 ml. drop of water is placed on the horizontally positioned treated substrate at a temperature of 22° C. The time taken for the water drop to dissipate, as measured by loss of gloss, is taken. This is the water wicking time.

DESCRIPTION OF THE PREFERRED EMBODIMENTS

The invention is now more particularly described with reference to the following Examples which are intended as illustrations of the invention and not to imply any limitation on its essential scope.

EXAMPLE 1

This example describes the production of a polyetherene and the properties of its blend with trimethylol propane trimethyacrylate (TMPTMA) when cured on a filter paper substrate.

One mole of methanol was reacted with five moles of allyl glycidyl ether in the presence of a boron trifluoride/ether catalyst using dropwise addition of the allyl glycidyl ether to heated stirred methanol over a period of several hours. After catalyst destruction the polyether-ene was then air-built by spraying air through the polymer until a Gardner viscosity at (25° C.) of G has been reached.

A mixture was made of 12.5 g of equal parts by weight of the polyether-ene and TMPTMA; 0.65 g of cobaltous acetate tetrahydrate (as a 0.50% aqueous solution); 0.40 g of a 40% aqueous slurry of sodium alkyl benzene sulfonate surfactant; 0.80 g of a non-ionic surfactant available under the trade designation "Triton X-305" from Rohm & Haas Company; and 35.65 g of deionized water. This gave a 25% actives mixture.

This mixture was emulsified for 3.0 minutes in a high speed blender adapted to avoid air entrainment.

The emulsion was applied to a Whatman #1 filter paper and the wet and dry strength were determined, by the techniques described above.

For the sake of comparison a cobaltous salt catalyzed treatment mixture of the polyether-ene alone and the TMPTMA alone, (both at 25% actives concentration), were produced in the same way and tested at the same application level. The results are set forth in Table 1 below. Each composition was tested twice.

TABLE 1

| Composition | Water Wicking Time (sec.) | Cured Properties | | W/D avg. |
| | | Wet Strength (W) gm/cm MD/CD | Dry Strength (D) gm/cm MD/CD | |
|---|---|---|---|---|
| Polyether-ene alone | 17 | 3284/3338 | 7301/7551 | .446 |
| TMPTMA alone | — | 37.49/33.92 | 410.6/357 | .093 |
| Blend of invention | 25 | 4784/5140 | 7622/7935 | .639 |

As can be seen from the above the cured blend of the invention generated a higher wet and dry strength with a far better W/D ratio than was measured using either component alone at the same application level.

EXAMPLE 2

This Example follows the same plane as Example 1 with the difference that the polyether-ene was obtained by the reaction of ethylene glycol with allyl glycidyl ether in a 1:10 mole ratio. The polymer was not air-bodied but used at its initial Gardner viscosity of F at 25° C. In addition the acrylate monomer selected was dipentaerythritol hydroxypentaacrylate (DPE HPA).

In the case of each of the major components the Co++ salt catalyzed solutions employed had a 25% actives concentration.

The following composition was emulsified in a high speed blender and tested for wet and dry strength development in the manner described above.

12.5 g of polyether-ene
12.5 g of DPE HPA
1.6 g of Triton X-305
0.8 g of a sodium alkyl benzene sulfarate (as a 40% actives slurry
2.0 g of 5% aqueous Co++ acetate tetrahydrate solution
70.6 g of deionized water.

The results are shown in Table 2, which also displays the results obtained when the same compositions minus the polyether-ene and minus the DPE HPA were tested at the same actives application level.

Finally the effect of adding 7% by weight (based on total solids charged) of glycerol to the basic invention formulation is demonstrated against at the same total solids application level.

TABLE 2

| Composition | Water Wicking Time (sec.) | Cured Properties (3) | | W/D ratio |
| | | Wet Strength (W) gm/cm | Dry Strength (D) gm/cm | |
|---|---|---|---|---|
| Polyether-ene (alone) | 4.0 | 3267/3267 | 6551/6158 | .515 |
| DPE HPA (alone) | — | 26.78/35.70 | 232.1/410.6 | .101 |
| Polyether-ene + DPE HPA (1) | 600 approx. | 5105/5676 | 7640/8514 | .668 |
| Polyether-ene + DPE HPA + Glycerol (2) | 2.8 | 4284/4605 | 6123/6194 | .722 |

(1) Treated sheet was hard and stiff and had considerable rigidity when wet. It should be noted that the treating composition comprised equal weight of crosslinking monomer and the polyether-ene. Softness and handle can also be improved by reducing the proportion of the crosslinking monomer relative to the polyether-ene.
(2) Treated sheet was soft and absorbent and showed good handle.
(3) First value is in cross-direction; the second is in machine direction.

The results set forth in Examples 1 and 2 indicate that little if any curing has taken place when the acrylate monomer/catalyst mixture alone is added but that with the inclusion of the polyether-ene, curing reactions clearly occurred.

Indeed both wet and dry strength are significantly improved and, though the water wicking time is increased showing decreased hydrophilicity, the balance can be corrected towards hydrophilicity with an acceptable drop in wet/dry strength by addition of glycerol.

EXAMPLE 3

This Example demonstrates the effect of the addition of a latex component to the composition of the invention. The components used were as follows:

Polyether-ene—The same ethylene glycol/allyl glycidal ether reaction product as was used in Example 2 except that the polymer is air-bodied in the presence of a cobaltous salt catalyst and air($O_2$) to a Gardner viscosity of Z-2 at 25° C.

Acrylate—Pentaerythritol tetraacrylate (PETA)
Latex—Polyvinyl acetate (PVAc)

A first composition comprising the following components was prepared in emulsion form:

6.25 g of the polyether-ene
6.25 g of PETA
0.40 g of sodium alkyl benzene sulfonate (40% actives)
0.80 g of Triton X-305
1.0 g of cobaltour acetate tetrahydrate (as 5.0% aqueous solution
35.3 g of deionized water Into half of this emulsion blend were slowly stirred 24.5 g of a 25% solids latex of PVAc and 0.5 g of a 5% aqueous cobaltous acetate tetrahydrate solution. This gave a 1:1 emulsion/latex blend with a 25% solids concentration.

Additionally a 1:1 (by solids weight) blend of the polyether-ene and the PVAc latex, and a 1:1 (by solids weight) blend of the PETA and the PVAc latex were prepared. Each blend was catalyzed using a cobalt salt.

All of the above were evaluated for wet and dry strength and compared against the polyetherene alone, the PETA alone and the latex alone. The results are set forth in Table 4.

TABLE 3

Identification of components in compositions whose property responses on application to paper substrates are reported in Table 4.

| Component Composition | Weight Proportions | | |
|---|---|---|---|
| | Polyether-ene | PETA | PVAc |
| Inv. 1 | 1 | 1 | 1 |
| Inv. 2 | 0.5 | 0.5 | 1 |
| Comp. 1 | 1 | | |
| Comp. 2 | | 1 | |
| Comp. 3 | | | 1 |
| Comp. 4 | 1 | | 1 |
| Comp. 5 | | 1 | 1 |

TABLE 4

| Composition | Wet Strength (W) gm/cm (1) | Dry Strength (D) gm/cm (1) | W/D ratio ratio avg. |
|---|---|---|---|
| Inv. 1 (2) | 4052/4320 | 6979/7426 | .582 |
| Inv. 2 (2) | 4463/4498 | 7086/7176 | .628 |
| Comp. 1 | 3356/3409 | 7069/7158 | .476 |
| Comp. 2 | 30.35/37.49 | 271.3/305.2 | .118 |
| Comp. 3 (3) | 731.9/1125 | 6480/7104 | .136 |
| Comp. 4 | 3749/3659 | 7711/7283 | .494 |
| Comp. 5 (3) | 500/625 | 3606/4052 | .147 |

(1) All measurements give first the cross-direction and second the machine direction values.
(2) Very rigid, stiff and tough. Water fairly readily wets the surface but does not easily penetrate many of the filled voids.
(3) Paper soft but weak - very low tear strength From the results in Table 4 it can be seen that even when half the added weight of the composition of the invention is replaced by a latex, at least comparable levels of strength are obtained with an even better W/D ratio.

EXAMPLE 4

This Example duplicates Example 3 except that the polyether-ene used is non-air-bodied, i.e. it is the polyether-ene used in Example 2. In addition the acrylate is TMP TMA, also as used in Example 2.

In all other respects the compositions were made up and tested in the manner described in Example 3.

TABLE 5

Identification of components in compositions whose property responses on application to paper substrates are reported Table 6.

| Component Composition | Weight Proportions | | |
|---|---|---|---|
| | Polyetherene | TMP TMA | PVAC |
| Inv. 1 | 1 | 1 | |
| Inv. 2 | 0.5 | 0.5 | 1 |
| Comp. 1 | 1 | | |
| Comp. 2 | | 1 | |
| Comp. 3 | | | 1 |
| Comp. 4 | 1 | | 1 |
| Comp. 5 | | 1 | 1 |

TABLE 6

| Composition | Wet Strength (W) gm/cm (1) | Dry Strength (D) gm/cm (1) | W/D ratio (average) |
|---|---|---|---|
| Inv. 1 | 5052/5605 | 7693/8568 | .656 |
| Inv. 2 | 5105/4962 | 8407/8140 | .609 |
| Comp. 1 | 3088/3276 | 6158/6551 | .500 |
| Comp. 2 | 35.70/37.49 | 339.2/392.7 | .101 |
| Comp. 3 | 714.0/1142 | 6444/7265 | .134 |
| Comp. 4 | 3677/3713 | 6997/7015 | .528 |
| Comp. 5 | 517.7/606.9 | 3713/3927 | .147 |

(1) All measurements give first the cross-machine direction and second the machine direction values.

EXAMPLE 5

The following Example illustrates the effect of using an acrylic polymer as the latex and the effect of adding a polyhydroxy compound to the composition.

Two compositions useful in the process of the invention were formulated as follows.

The polyether-ene of Example 2 (12.5 g) was emulsified with a mixture comprising 1.25 g of a 5% aqueous solution of $Co++$ acetate tetrahydrate, 0.40 g of a 40% actives sodium alkyl benzene sulfonate surfactant, 0.80 of the non-ionic surfactant Triton X-305, and 35.5 g of deionized water. Fifty grams of a 25% solids latex of an acrylic polymer available from Rohm & Haas Company under the trade designation Rhoplex HA-8 were added to the above emulsions and the resultant blend was adjusted to a 25% solids content.

To the above was added a mixture of 12.5 g of TMP TMA with the cobalt salt, surfactants and water in the amounts present in the first mixture.

This resulted in 150 g of an emulsion/latex blend of the polyether-ene, the acrylic monomer and the latex. Two thirds of this emulsion/latex blend was treated with 2.50 g of glycerol to give a 10%, solids weight, loading of glycerol in the mixture.

The glycerol treated sample and the untreated sample were both evaluated by the techniques described above. The results are shown in Table 7.

TABLE 7

| Composition | Water Wicking Time | Wet Strength (1) gm/cm (W) | Dry Strength (1) gm/cm (D) | W/D ratio average |
|---|---|---|---|---|
| Comp. & glycerol | 4.1 sec. | 4177/4445 | 6015/6390 | .695 |
| Comp. alone | 31 mins. | 4445/4695 | 6854/7194 | .651 |

(1) The first figure is the cross-machine direction strength and the second is the machine direction strength. The paper treated with the composition incorporating glycerol produced a soft, absorbent product with excellent handle. The paper treated with the composition lacking glycerol was somewhat stiff and tough and not easily wetted by water.

EXAMPLE 6

This Example follows exactly the procedure described in Example 5 with the substitution of the diacrylate of polyethylene glycol 200 for TMP TMA.

The formulation and testing were otherwise exactly the same and the results obtained are set forth in Table 8.

TABLE 8

| | Cured Strengths | | |
|---|---|---|---|
| | Wet Tensile Strength (W) gm/cm | Dry Tensile Strength (D) gm/cm | W/D ratio |
| Cross Machine | 4355 | 7336 | .594 |
| Machine Direction | 4909 | 8211 | .598 |

The treated paper is relatively soft and water absorptive by comparison with the paper obtained in Example 5.

EXAMPLE 7

This Example illustrates the use of allyl group containing monomers capable of both oxidative polymerization and free-radical polymerization reactions and compares the results with those obtained using exclusively free radical polymerizable acrylic monomers.

In this Example the polyether-ene of Example 2 was used in two forms: the non-air-bodied form with a Gardner viscosity of F (at 25° C. and an air-bodied form with a viscosity of N+(25° C.). These two are identified as "polyether-ene" and "polyether-ene*" respectively.

Four aliquot emulsions of 6.25 g of diallyl phthalate, 0.4 g of a 40% actives sodium alkyl benzene sulfonate surfactant, 0.8 g of Triton X-305 (surfactant), 1.0 g of a 5% aqueous solution of Co++ acetate tetrahydrate and 35.3 g of deionized water was prepared. Two of the aliquots were emulsified with 6.25 g of the polyether-ene and two with 6.25 g of the polyether-ene*.

Each emulsion therefore had a 25% actives content.

To one of each pair, 49.0 g of a 25% solids latex of polyvinyl acetate and 1.0 g of a 5% aqueous solution of Co++ acetate tetrahydrate were added.

All samples were applied to filter paper circles in the manner described above and were allowed to dry/cure under ambient, constant temperature/humidity conditions.

Each of the four was then tested for wet and dry strength development in the monomer described above. The ratio of components in the formulations is set forth in Table 9 and the results of the evaluations are shown in Table 10.

TABLE 9

| | | | Proportions by wgt. | |
|---|---|---|---|---|
| Composition | Polyether-ene* | Polyether-ene | DAP | Polyvinyl acetate |
| A | 1 | — | 1 | — |
| B | 0.5 | — | 0.5 | 1 |
| C | — | 1 | 1 | — |
| D | — | 0.5 | 0.5 | 1 |

TABLE 10

| Composition (See Table 9) | | Tensile Strength (Machine Direction in gm/cm) | |
|---|---|---|---|
| | After 1-day | After 8-days | After 15-days |
| A - Wet Tensile | 3608 | 6233 | 4394 |
| Dry Tensile | 6483 | 7233 | 7305 |
| W/D | .556 | .585 | .601 |
| B - Wet Tensile | 2822 | 3143 | 3215 |
| Dry Tensile | 6090 | 6447 | 6590 |
| W/D | .463 | .487 | .488 |
| C - Wet Tensile | 3411 | 4501 | 4965 |
| Dry Tensile | 6001 | 7519 | 8198 |
| W/D | .569 | .599 | .606 |
| D - Wet Tensile | 554 | 2947 | 3447 |
| Dry Tensile | 2393 | 6108 | 6769 |
| W/D | .231 | .482 | .509 |

The wet/dry strength response indicates that the polymerization of the diallyl phthalate proceeds much more rapidly in the presence of the latex than in its absence.

The slow development of exceptional wet and dry strength values that is shown by the use of the polyether-ene (non-air-bodied) in Composition C is potentially very useful in applications where some of the treated substrate is scrapped during processing. In such processes the broke can be recycled before it has developed significant strength.

What is claimed is:

1. A process for improving the physical properties of a fibrous substrate which comprises applying thereto a composition of matter comprising:

A. a polyether-ene having the formula

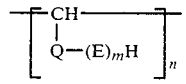

where Q is a moiety terminating in the residue of an active hydrogen-containing group selected from the group consisting of alcoholic hydroxyl, thiol, amide, carboxylic acid and secondary amine with an active hydrogen removed, E is a moiety containing a radical having an activated olefinic unsaturation, either $\alpha,\beta$ or $\beta,\gamma$ to the activating group, n is the number of adjacent segments having this formula, and n and m are integers and are each at least 1, provided that where one is less than 4 the other is at least 4; and B. a non-air-curing compound having a structure comprising at least two free-radical polymerizable unsaturated groups;

and allowing the composition to thermoset cure irreversibly on the substrate.

2. A process according to claim 1 in which the component A is the reaction product of hydroxyl-containing compound with at least 4 molecules of allyl glycidyl ether per hydroxyl group in the hydroxyl-containing compound.

3. A process according to claim 1 in which Component B is a compound that comprises at least two groups having the formula

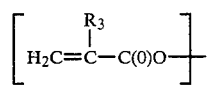

wherein $R_3$ is hydrogen or a $C_1$-$C_2$ alkyl group.

4. A process according to claim 1 in which Component B is a compound that comprises at least two groups having the formula

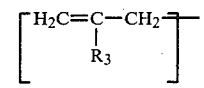

wherein $R_3$ is hydrogen or a $C_1$-$C_2$ alkyl group.

5. A process according to claim 1 in which the composition also comprises a free-radical polymerizable mono-olefinic monomer miscible with components A and B and capable of undergoing a thermoset cure or irreversible cross-linking reaction in concert with Component A.

6. A process according to claim 1 in which the mixture of Components A and B is an aqueous solution or emulsion and the composition further comprises a latex of a thermoplastic polymer.

7. A process according to any one of claims 1 to 6 in which the composition comprises a polyhydroxy compound.

8. A process according to any one of claims 1 to 6 in which the composition is applied at a level of from 5 to 500 kg per metric ton of the substrate.

9. A process for improving the wet and dry strength of a cellulosic substrate which comprises applying thereto from 10 to 300 kg per metric ton of substrate of a composition comprising:
   A. from 2 to 98 parts by weight of the reaction product of one mole of ethylene glycol with at least eight moles of allyl glycidyl ether; and
   B. from 98 to 2 parts by weight of a thermosetting compound having at least two groups with the formula

wherein $R_3$ is hydrogen, methyl or ethyl and $R_4$ is —COO— or —$CH_2$—.

10. A process according to claim 9 in which the composition also comprises a free-radical polymerizable monoolefinic monomer miscible with Components A and B and capable of undergoing a thermoset cure or irreversible cross-linking in concert with Component A.

11. A process according to claim 9 in which Components A and B, present as aqueous emulsions are mixed with a latex of a thermoplastic polymer having a glass transition temperature below 40° C.

12. A process according to claim 11 in which the thermoplastic polymer latex is selected from the group consisting of polyvinyl acetate, ethylene/vinyl acetate copolymers and acrylate polymers.

13. A process according to claim 11 in which the thermoplastic polymer is added to such an amount that it provides from 10 to 60% of the weight of the composition based on total solids weight.

14. A process according to any one of claims 9 to 13 in which up to 20% by weight, based on the total actives weight in the composition, of glycerol is added to the composition before application to the substrate.

* * * * *